United States Patent
Berube

(10) Patent No.: US 10,173,280 B1
(45) Date of Patent: Jan. 8, 2019

(54) WELDER BRUSH SYSTEMS

(71) Applicant: Dennis J. Berube, Laveen, AZ (US)

(72) Inventor: Dennis J. Berube, Laveen, AZ (US)

(*) Notice: Subject to any disclaimer, the term of this patent is extended or adjusted under 35 U.S.C. 154(b) by 673 days.

(21) Appl. No.: 14/069,204

(22) Filed: Oct. 31, 2013

Related U.S. Application Data

(60) Provisional application No. 61/796,109, filed on Nov. 2, 2012.

(51) Int. Cl.
*B23K 9/10* (2006.01)
*H01R 39/36* (2006.01)
*H02K 13/00* (2006.01)

(52) U.S. Cl.
CPC .................. *B23K 9/1012* (2013.01)

(58) Field of Classification Search
CPC ........ H01R 39/18; H01R 39/20; H01R 39/24; H01R 39/26; H01R 39/36; B23K 9/1012; B23K 9/10; H02K 13/00
USPC ......... 219/134; 310/248–249, 251–252, 253; 29/826
See application file for complete search history.

(56) References Cited

U.S. PATENT DOCUMENTS

| | | | | | |
|---|---|---|---|---|---|
| 2,305,206 | A | * | 12/1942 | Strobel | B23K 9/1037 219/132 |
| 2,796,544 | A | * | 6/1957 | Silverman | H01R 39/27 310/246 |
| 3,017,529 | A | * | 1/1962 | Helwig | H01R 39/26 310/248 |
| 5,739,619 | A | * | 4/1998 | Thornley | H01R 39/58 310/245 |
| 2011/0018386 | A1 | * | 1/2011 | Hoell | H01R 39/24 310/251 |

OTHER PUBLICATIONS

Weldmart-Online (Lincoln Replacement Welder Brushes).*
Wayback Machine Date (for Weldmart-Online NPL reference).*
NPL to www.compositescentral.com.*

* cited by examiner

*Primary Examiner* — Michael G Hoang
(74) *Attorney, Agent, or Firm* — Lodestar Patents, PLLC; Raymond J. E. Hall

(57) ABSTRACT

Welding brush systems having split heads designed to improve welder performance at least on Lincoln SA200, SA250, SA300, SAE300, SA200D, SA300D and Classic 1, 2 and 3 models of portable powered DC welders with commutators.

16 Claims, 2 Drawing Sheets

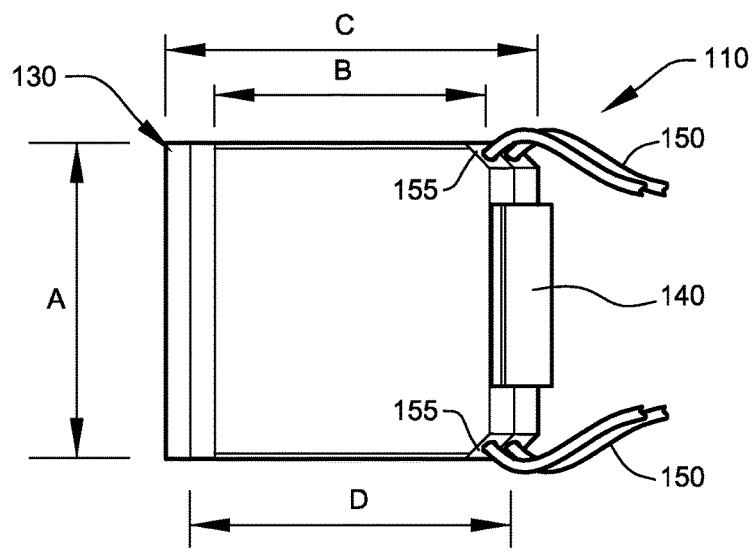
FIG. 4
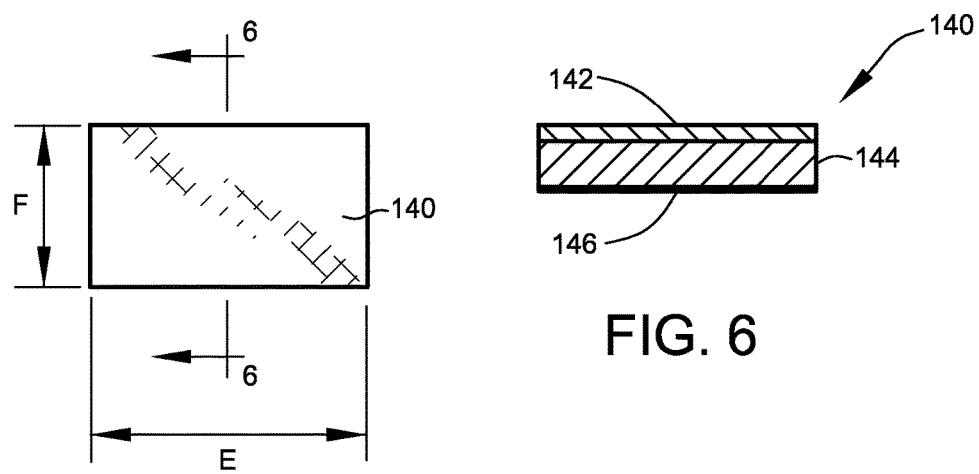
FIG. 5
FIG. 6

WELDER BRUSH SYSTEMS

CROSS-REFERENCE TO RELATED APPLICATION

The present application is related to and claims priority from prior provisional application Ser. No. 61/796,109, filed Nov. 2, 2012, entitled "WELDER BRUSH SYSTEMS", the contents of which are incorporated herein by this reference and are not admitted to be prior art with respect to the present invention by the mention in this cross-reference section.

BACKGROUND

This invention relates to providing a system for improved welder brush system. More particularly, this invention relates to providing a system for portable powered DC welders with commutators. Using stock brushes, portable powered DC welders tend to produce spikes in the waveform output. These spikes are harmful in DC armature welding machines. Spikes are related to back-emf, increased welding machine wear, poor deposition of rod material, and longer weld times. Therefore, it is highly useful and desirable to provide a system which decreases spikes and improves overall performance of portable powered DC welders.

OBJECTS AND FEATURES OF THE INVENTION

A primary object and feature of the present invention is to provide a welder brush system overcoming the above-mentioned problem(s).

It is a further object and feature of the present invention to provide such a welder brush system having multiple shunts.

It is another object and feature of the present invention to provide such a welder brush system having shunts connected to opposite corners of the brush head.

Another object and feature of the present invention is to provide such a welder brush system having multiple wafers of material.

A further primary object and feature of the present invention is to provide such a welder brush system using different grades of materials in different wafers.

A further object and feature of the present invention is to provide a welder brush system using T300 and T800 grade carbon.

Another primary object and feature of the present invention is to provide such a welder brush system engineered to optimize Lincoln model SA200, SA250, SA300, SAE300, SA200D, and SA300D welders.

Another further object and feature of the present invention is to provide such a welder brush system engineered to optimize Lincoln Classic 1, 2 and 3 model welders.

An additional object and feature of the present invention is to provide such a welder brush system which reduces run-time of welders.

A further object and feature of the present invention is to provide such a welder brush system which reduces fuel use of welders.

Another object and feature of the present invention is to provide such a welder brush system which reduces pollution of welders.

An additional object and feature of the present invention is to provide such a welder brush system which wears brushes evenly during use.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a welding brush system, relating to portable powered DC welders with commutators, comprising: at least one collector brush structured and arranged to complete an electrical circuit through at least one commutator; wherein such at least one collector brush comprises at least one collector brush head structured and arranged to engage the at least one commutator; wherein such at least one collector brush head comprises at least two wafers of material; and wherein such at least two wafers of material comprise two different grades of materials. Moreover, it provides such a welding brush system wherein such at least one collector brush is structured and arranged to operate in at least one of the following models of portable powered DC welders with commutators: Lincoln SA200, Lincoln SA250, Lincoln SA300, Lincoln SAE300, Lincoln SA200D, Lincoln SA300D, Lincoln Classic 1, Lincoln Classic 2, and Lincoln Classic 3.

Additionally, it provides such a welding brush system wherein such two different grades of material comprise carbon. Also, it provides such a welding brush system wherein such two different grades of material comprise T300 carbon and T800 carbon. In addition, it provides such a welding brush system wherein such at least one collector brush further comprises at least four shunt leads structured and arranged to shunt power from such at least one collector brush head, and at least one electrical lug structured and arranged to electrically couple such at least four shunt leads. And, it provides such a welding brush system wherein such at least four shunt leads comprise braided copper.

Further, it provides such a welding brush system wherein such at least four shunt leads comprise 0.13 inch braided copper. Even further, it provides such a welding brush system wherein such at least one collector brush head is engineered to exhibit greater wear, from normal operation, than wear of the at least one commutator. Moreover, it provides such a welding brush system wherein such at least one collector brush head further comprises at least one tension spring engager structured and arranged to engage with at least one tension spring.

Additionally, it provides such a welding brush system wherein such at least one tension spring engager comprises at least one insulator structured and arranged to electrically insulate such at least one collector brush head from the at least one tension spring. Also, it provides such a welding brush system wherein such at least one tension spring engager comprises at least one vibration dampener structured and arranged to dampen vibrations of such at least one collector brush head. In accordance with another preferred embodiment hereof, this invention provides a welding brush system, relating to portable powered DC welders with commutators, comprising: at least one commutator circuit connector structured and arranged to complete an electrical circuit through at least one commutator; wherein such at least one commutator circuit connector comprises at least one commutator engager structured and arranged to engage the at least one commutator, at least four power shunts structured and arranged to shunt power from such at least one commutator engager, and at least one power shunt coupler structured and arranged to couple such at least four power shunts; wherein such at least one commutator engager comprises at least two wafers of material; and wherein such at least two wafers of material comprise two different grades of materials.

In addition, it provides such a welding brush system wherein such two different grades of material comprise carbon. And, it provides such a welding brush system wherein such two different grades of material comprise T300 carbon and T800 carbon. Further, it provides such a welding brush system wherein such at least one commutator engager is engineered to exhibit greater wear, from normal operation, than wear of the at least one commutator. Even further, it provides such a welding brush system wherein such at least one commutator engager further comprises at least one tension engager structured and arranged to engage with at least one tension provider.

Even further, it provides such a welding brush system wherein such at least one tension engager comprises at least one insulator structured and arranged to electrically insulate such at least one commutator engager from the at least one tension provider. Even further, it provides such a welding brush system wherein such at least one tension engager comprises at least one vibration dampener structured and arranged to dampen vibrations of such at least one commutator engager.

In accordance with another preferred embodiment hereof, this invention provides a welding brush system, relating to portable powered DC welders with commutators, comprising: commutator circuit connector means for completing an electrical circuit through at least one commutator; wherein such commutator circuit connector means comprises commutator engager means for engaging the at least one commutator, power shunt means for shunting power from such at least one commutator engager, power shunt coupler means for coupling such at least four power shunts; wherein such commutator engager means comprises at least two wafers of material; wherein such at least two wafers of material comprise two different grades of materials. Even further, it provides such a welding brush system wherein such commutator engager means operates in at least one of the following models of portable powered DC welders with commutators: Lincoln SA200, Lincoln SA250, Lincoln SA300, Lincoln SAE300, Lincoln SA200D, Lincoln SA300D, Lincoln Classic 1, Lincoln Classic 2, and Lincoln Classic 3.

BRIEF DESCRIPTION OF THE DRAWINGS

FIG. 4 shows a top view of the collecting brush head according to the preferred embodiment of FIG. 3.

FIG. 5 shows a plan view of a brush top pad according to the preferred embodiment of FIG. 4.

FIG. 6 shows the sectional view 6-6 of FIG. 5 according to the preferred embodiment of FIG. 5.

DETAILED DESCRIPTION OF THE BEST MODES AND PREFERRED EMBODIMENTS OF THE INVENTION

Portable powered DC welders with commutators rely on a smooth flow of current through the system. Smooth current flow permits higher efficiency, while spikes, back EMF, and interruptions cause inefficiencies, as well as additional wear on machines. Applicant has found specific collecting brush structures which smooth out current flow in the system, specifically, collecting brushes designed for use in Lincoln SA200, SA250, SA300, SAE300, SA200D, SA300D and Classic 1, 2 and 3 models of portable powered DC welders with commutators.

Figure 1:
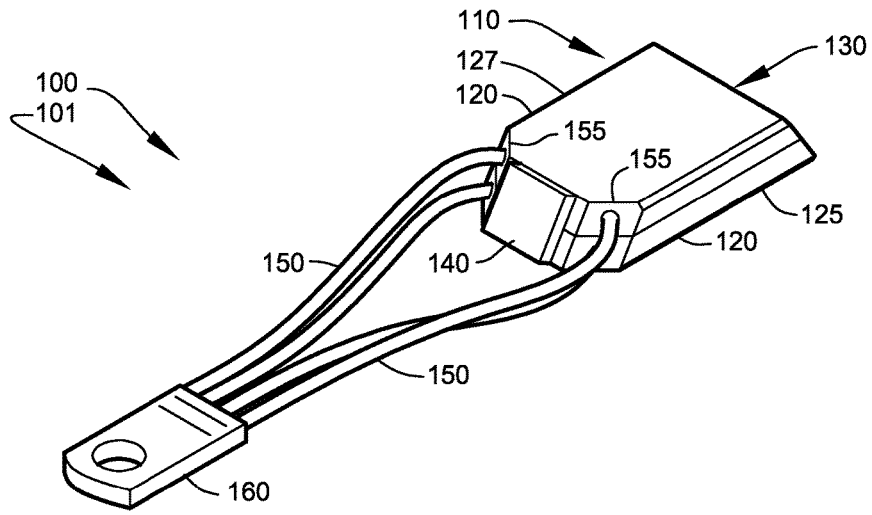
FIG. 1 shows a perspective view illustrating a collecting brush according to a preferred embodiment of the present invention.
Figure 2:
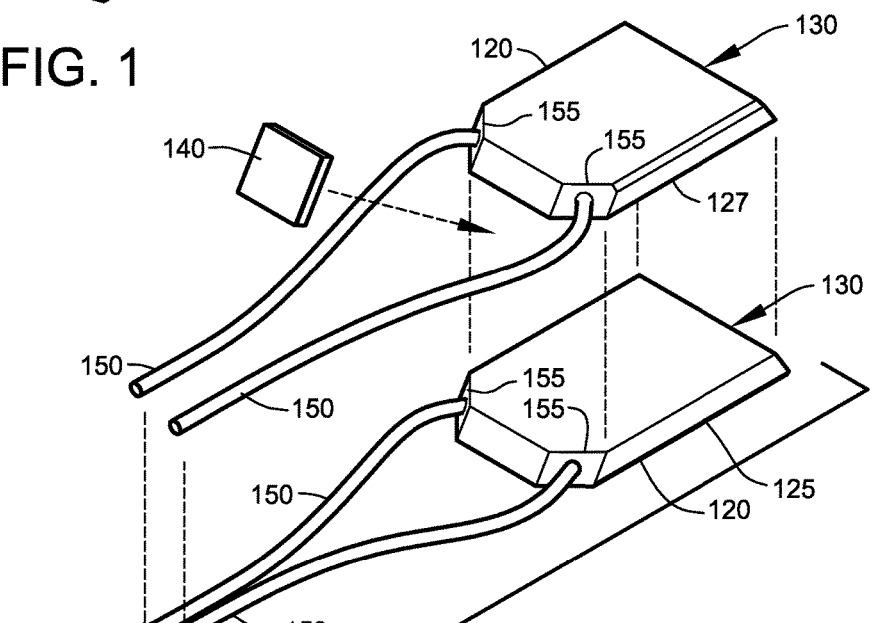
FIG. 2 shows an exploded view, illustrating the collecting brush, according to the preferred embodiment of FIG. 1.

FIG. 1 shows a perspective view illustrating a collecting brush 101 according to a preferred embodiment of the present invention. FIG. 2 shows an exploded view, illustrating collecting brush 101, according to the preferred embodiment of FIG. 1.

Collecting brush 101 (at least embodying herein commutator circuit connector means for completing an electrical circuit through at least one commutator) preferably comprises at least one collecting brush head 110 (at least embodying herein commutator engager means for engaging the at least one commutator), as shown. Collecting brush head 110 preferably comprises at least two wafers 120 (at least herein embodying wherein said commutator engager means comprises at least two wafers of material), as shown. Wafers 120 preferably are held together with at least one brush top pad 140, as shown. Wafers 120 preferably comprise at least one spinward-side wafer 125 and at least one antispinward-side wafer 127, as shown. Each Wafer 120 preferably comprises a different grade of material. Spinward-side wafer 125 preferably comprises carbon, preferably T800 carbon. Antispinward-side wafer 125 preferably comprises carbon, preferably T300 carbon. This arrangement at least herein embodies wherein said at least two wafers of material comprise two different grades of materials. Applicant has found through testing that a primary key to overcoming the above mentioned problem is the use of two different materials in collector brush 101. Upon reading the teachings of this specification, those skilled in the art will now appreciate that, under appropriate circumstances, considering such issues as cost, future technologies, available materials, etc., other material combinations, such as, for example, reversed T800-T300 arrangements, other carbon grades, other materials, etc., may suffice.

Applicant has observed that with collector brushes 101, in use current flow measured on an oscilloscope is smoothed, reducing the high spikes observed with stock collector brushes. Applicant has also observed that back EMF is likewise reduced. Applicant's preferred configuration therefore results in cleaner current flow permitting more rod material deposited in the weld puddle and permits an increase of current flow rate (turning up the machine) to speed the welding process.

Collecting brush 101 further comprises at least one shunt lead 150, preferably at least four shunt leads 150 (at least embodying herein power shunt means for shunting power from said at least one commutator engager), as shown. Shunt leads 150 preferably terminate in at least one electrical lug 160, as shown. All four shunt leads 150 preferably connect to a single electrical lug 160 (at least embodying herein power shunt coupler means for coupling said at least four power shunts), as shown. Electrical lug 160 preferably comprises copper, preferably tin-dipped copper. Upon reading the teachings of this specification, those skilled in the art will now appreciate that, under appropriate circumstances, considering such issues as future technologies, cost, available materials, etc., other electrical lugs, such as, for example, steel lugs, copper-clad lugs, steel-clad lugs, superconducting lugs, etc., may suffice.

Each wafer 120 preferably connects to at least two shunt leads 150, as shown. Each shunt lead 150 preferably connects to wafer 120 at top corner 155, as shown. Each pair of shunt leads 150 connected to each wafer 120 preferably connect at top corner 155 opposite from the other shunt lead 150, preferably such that both top corners 155 each connect to one shunt lead 150, as shown. Shunt lead 150 preferably comprises braided copper. Shunt lead 150 preferable comprises about ⅛ inch diameter, preferably 0.13 inch diameter. Shunt lead 150 preferable further comprises a length of about 3 inches. Upon reading the teachings of this specification, those skilled in the art will now appreciate that, under appropriate circumstances, considering such issues as future technology, cost, available materials, etc., other shunt leads, such as, for example, solid copper shunts, insulated shunts, braided-sheet shunts, etc., may suffice.

Applicant has observed that this configuration of shunt leads 150 pulls current evenly across collecting brush head 110. Such even current pull preferably maintains brush wear to be square with the commutator, during use. Applicant has also observed that, where preferred models of portable powered DC welders with commutators ordinarily utilize eight stock collecting brushes in operation, with applicant's preferred shunt lead structure and arrangement only four collecting brushes 101 need be operating to permit preferred models of portable powered DC welders with commutators to function normally. This reduction in necessary collecting brushes permits failure of up to four collecting brush circuits (brush failures, spring failures, etc.) without the need to stop work for maintenance in the middle of a job.

Figure 3:
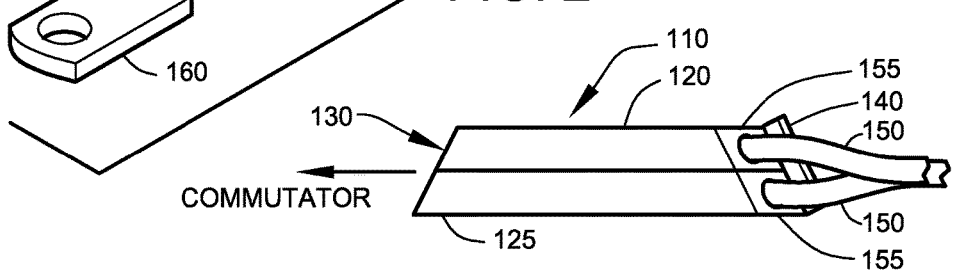
FIG. 3 shows a side view, illustrating a collecting brush head, according to the preferred embodiment of FIG. 2.

FIG. 3 shows a side view, illustrating a collecting brush head 110, according to the preferred embodiment of FIG. 2. FIG. 4 shows a top view of collecting brush head 110 according to the preferred embodiment of FIG. 3.

Collecting brush head 110 preferably comprises a commutator interface 130, as shown. Commutator interface 130 preferably comprises an incline angle of about 50 degrees, as shown. Collecting brush head 110 comprises a thickness of about ½ inch, preferably 0.50 inch. Wafers 120 preferably comprise a thickness of about ¼ inch, preferably 0.25 inch. Wafers 120 preferably further comprise a width A of about 1½ inch, preferably 1.5 inch, as shown. Spinward-side wafer 125 preferably comprises an outside length C of about 1⅝ inch, preferably 1.65 inch, as shown. Antispinward-side wafer 127 preferably comprises an outside length B of about 1¼ inch, preferably 1.25 inch, as shown. Spinward-side wafer 125 and antispinward-side wafer 127 preferably further comprises an inside length D of about 1½ inch, preferably 1.45 inch, as shown. Upon reading the teachings of this specification, those skilled in the art will now appreciate that, under appropriate circumstances, considering such issues as cost, performance, future technologies, etc., other dimensions, such as, for example, thicknesses of greater or less than ¼ inch, different thicknesses for each wafer, etc., may suffice.

FIG. 5 shows a plan view of a brush top pad 140 according to the preferred embodiment of FIG. 4. FIG. 6 shows the sectional view 6-6 of FIG. 5 according to the preferred embodiment of FIG. 5.

Brush top pad 140 preferably comprises at least one hard layer 142 and at least one shock layer 144, as shown. Hard layer 142 preferably provides a solid interface with a tension spring when installed. Hard layer 142 preferably comprises at least one hard plastic, as shown. Shock layer 144 preferably comprises at least one shock absorbing material, preferably rubber, as shown. Brush top pad 140 preferably further comprises at least one adhesive 146, as shown. Adhesive preferably bonds brush top pad 140 to wafers 120, as shown.

Brush top pad 140 preferably comprises a height of about ½ inch. Brush top pad 140 preferably comprises a width E of about 1 inch, preferably 0.95 inch. Brush top pad 140 preferably comprises a height F sufficient to cover thickness of all wafers 120. Brush top pad 140 preferably comprises a thickness of about 3/16 inch, preferably 0.18 inch. Hard layer 142 preferably comprises a thickness of about 1/16 inch, preferably 0.06 inch. Shock layer 144 preferably comprises a thickness of about ⅛ inch, preferably 0.12 inch.

In use, brush top pad 140 engages with at least one spring of the brush holder on the welder. Brush top pad 140 insulates the current flowing through the brush from conducting through the at least one spring (at least embodying herein wherein said at least one tension spring engager comprises at least one insulator structured and arranged to electrically insulate said at least one collector brush head from the at least one tension spring). The at least one spring preferably presses collecting brush head 110 into contact with commutator, maintaining consistent connection for current flow. Materials of collecting brush head 110 preferably wear more easily than the commutator, preferably providing servicing of replacing brushes rather than replacing commutators. As collecting brush head 110 wears, the at least one spring maintains pressure on brush top pad 140 (at least herein embodying wherein said at least one collector brush head further comprises at least one tension spring engager structured and arranged to engage with at least one tension spring) to retain good connection between collector brush head 110 and commutator.

Applicant has observed through testing that use of preferred collecting brushes 101 increases efficiency of Lincoln SA200, SA250, SA300, SAE300, SA200D, SA300D and Classic 1, 2 and 3 models of portable powered DC welders with commutators. Preferred collecting brushes 101 permit increased levels of voltage/current to be utilized while maintaining puddle control. Preferred collecting brushes 101 permit even wear on brushes. Preferred collecting brushes 101 permit welding to produce fewer sparks (depositing more rod material into the weld). Preferred collecting brushes 101 permit less rod use on a job. Preferred collecting brushes 101 reduce the amount of grinded needed. Preferred collecting brushes 101 permit job completion with less run time (therefore, less air pollution, less fuel, less maintenance, less ground pollution from rod waste, etc.).

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A welding brush system, relating to portable powered DC welders with commutators, comprising:
   a) at least one collector brush structured and arranged to complete an electrical circuit through at least one commutator;

b) wherein said at least one collector brush comprises at least one collector brush head structured and arranged to engage the at least one commutator;
c) wherein said at least one collector brush head comprises at least two wafers of material;
d) wherein said at least two wafers of material comprise two different grades of materials; and
e) wherein said two different grades of materials differentiate as two different materials within a series of materials consisting of T-series carbons.

2. The welding brush system according to claim 1 wherein said at least one collector brush is structured and arranged to operate in at least one of the following models of portable powered DC welders with commutators:
a) Lincoln SA200,
b) Lincoln SA250,
c) Lincoln SA300,
d) Lincoln SAE300,
e) Lincoln SA200D,
f) Lincoln SA300D,
g) Lincoln Classic 1,
h) Lincoln Classic 2, and
i) Lincoln Classic 3.

3. The welding brush system according to claim 1 wherein said two different grades of material comprise T300 carbon and T800 carbon.

4. The welding brush system according to claim 1 wherein said at least one collector brush further comprises at least four shunt leads structured and arranged to shunt power from said at least one collector brush head, and at least one electrical lug structured and arranged to electrically couple said at least four shunt leads.

5. The welding brush system according to claim 4 wherein said at least four shunt leads comprise braided copper.

6. The welding brush system according to claim 5 wherein said at least four shunt leads comprise 0.13 inch braided copper.

7. The welding brush system according to claim 1 wherein said at least one collector brush head is engineered to exhibit greater wear, from normal operation, than wear of the at least one commutator.

8. The welding brush system according to claim 1 wherein said at least one collector brush head further comprises at least one tension spring engager structured and arranged to engage with at least one tension spring.

9. The welding brush system according to claim 8 wherein said at least one tension spring engager comprises at least one insulator structured and arranged to electrically insulate said at least one collector brush head from the at least one tension spring.

10. The welding brush system according to claim 8 wherein said at least one tension spring engager comprises at least one vibration dampener structured and arranged to dampen vibrations of said at least one collector brush head.

11. A welding brush system, relating to portable powered DC welders with commutators, comprising:
a) at least one commutator circuit connector structured and arranged to complete an electrical circuit through at least one commutator;
b) wherein said at least one commutator circuit connector comprises
i) at least one commutator engager structured and arranged to engage the at least one commutator,
ii) at least four power shunts structured and arranged to shunt power from said at least one commutator engager, and
iii) at least one power shunt coupler structured and arranged to couple said at least four power shunts;
c) wherein said at least one commutator engager comprises at least two wafers of material;
d) wherein said at least two wafers of material comprise two different grades of materials; and
e) wherein said two different grades of materials differentiate as two different materials within a series of materials consisting of T-series carbons.

12. The welding brush system according to claim 11 wherein said two different grades of material comprise T300 carbon and T800 carbon.

13. The welding brush system according to claim 11 wherein said at least one commutator engager is engineered to exhibit greater wear, from normal operation, than wear of the at least one commutator.

14. The welding brush system according to claim 11 wherein said at least one commutator engager further comprises at least one tension engager structured and arranged to engage with at least one tension provider.

15. The welding brush system according to claim 14 wherein said at least one tension engager comprises at least one insulator structured and arranged to electrically insulate said at least one commutator engager from the at least one tension provider.

16. The welding brush system according to claim 14 wherein said at least one tension engager comprises at least one vibration dampener structured and arranged to dampen vibrations of said at least one commutator engager.

* * * * *